United States Patent [19]
Saitoh

[11] Patent Number: 5,463,737
[45] Date of Patent: Oct. 31, 1995

[54] INSTRUCTION BUFFER CONTROLLER IN PROCESSOR ENABLING DIRECT REFETCHING OF AN INSTRUCTION

[75] Inventor: Takenori Saitoh, Ibaragi, Japan

[73] Assignee: NEC Corporation, Tokyo, Japan

[21] Appl. No.: 23,432

[22] Filed: Feb. 26, 1993

[30] Foreign Application Priority Data

Feb. 27, 1992 [JP] Japan .................................. 4-041464

[51] Int. Cl.$^6$ .................................................. G06F 12/00
[52] U.S. Cl. ............. 395/496; 364/243.41; 364/DIG. 1; 364/DIG. 2; 395/375; 395/421.03
[58] Field of Search ...................... 395/250, 425

[56] References Cited

U.S. PATENT DOCUMENTS

| | | | |
|---|---|---|---|
| 4,442,488 | 4/1984 | Hall | 395/425 |
| 5,185,871 | 2/1993 | Frey et al. | 395/375 |
| 5,285,527 | 2/1994 | Crick et al. | 395/425 |
| 5,317,720 | 5/1994 | Stamm et al. | 395/425 |

*Primary Examiner*—Ken S. Kim
*Attorney, Agent, or Firm*—Foley & Lardner

[57] ABSTRACT

An instruction buffer controller according to the present invention comprises an instruction buffer for prefetching and writing of instructions in the main storage and a storage pointer which holds the address of the instruction fetched from the instruction buffer currently being executed or initial addresses of completed instructions in the instruction buffer. It also comprises a storage controller which stores the instruction currently being executed at the instruction buffer until execution completion of that instruction or stores a predetermined number of completed instructions at the instruction buffer. It causes its judgment means to judge whether the address of the instruction to be re-fetched exists between the writing address for the instruction buffer and the storage pointer address and, if such address exists there, sets the address of the re-fetched instruction at the reading pointer as the reading address of the instruction buffer.

8 Claims, 6 Drawing Sheets

5,463,737

INSTRUCTION BUFFER CONTROLLER IN PROCESSOR ENABLING DIRECT REFETCHING OF AN INSTRUCTION

BACKGROUNDS OF THE INVENTION

1. Field of the Invention

The present invention relates to instruction buffer control in a processor, and particularly relates to an instruction buffer controller which enables speedy re-fetching of instructions.

2. DESCRIPTION OF THE PRIOR ART

Conventionally, a processor generally prefetches instructions stored in the main storage and stores them in the instruction buffer so that it can fetch the instruction to be executed from the instruction buffer. Such instruction fetching using a buffer capable of processing at a speed higher than the main storage realizes improved speed of processing. When an instruction is fetched from the instruction buffer and then issued to the instruction execution section, the instruction buffer is controlled so as to drive out the applicable instruction.

Thus, in conventional control of an instruction buffer, an instruction once fetched from the instruction buffer is removed from the instruction buffer. Therefore, if an interruption occurs during execution of an instruction, there may be a problem: when executing again the instruction which was being executed after processing of the interruption, that instruction already driven out of the instruction buffer cannot be fetched from the buffer and must be obtained from the main storage. It requires a longer time until completion of instruction execution than a case where the instruction is fetched from the instruction buffer.

Besides, a branch instruction for branching to the address of the instruction which has been completed causes a program loop where the same instruction is repeated, which requires re-fetching of the completed instruction. In this case, too, since the instruction once fetched and executed is driven out of the instruction buffer, that instruction must be transferred from the main storage for execution of that instruction again. The time required for re-fetching of the instruction impedes speedy execution of the instruction.

SUMMARY OF THE INVENTION

An object of the present invention is to provide an instruction buffer controller which enables direct re-fetching of an instruction from the instruction buffer in re-execution of already fetched instruction with eliminating the time required for fetching of that instruction from the main storage and thereby improves the processor performance.

According to a preferred embodiment of the present invention to attain the above object, a processor instruction buffer controller comprises an instruction buffer which prefetches and writes instructions stored in the main storage, a writing pointer which keeps the writing address of the instruction fetched out of the main storage for writing to the instruction buffer, a reading pointer which keeps the reading address of the instruction serially fetched from the instruction buffer, a storage pointer which keeps the address of the instruction fetched from the instruction buffer and being executed in the instruction buffer, a storage controller which controls so that the instruction during execution is kept at the instruction buffer until completion of its execution, a judgment means to judge whether the address of the instruction to be re-fetched exists between the writing pointer address and the storage pointer address and a reading controller which sets the re-fetch address at the reading pointer when the address of the instruction to be re-fetched exists there.

According to a further preferred embodiment, the judgment means outputs a buffer hit signal to the reading controller when it judges that the address for the re-fetched instruction exists between the writing pointer address and the storage pointer address and the reading controller sets the re-fetch address at the reading pointer upon receipt of the buffer hit signal. According to a still preferred embodiment, the storage controller of a processor instruction buffer controller updates the address at the storage pointer for the word length of the completed instruction upon completion of the instruction fetched from the instruction buffer.

According to another preferred embodiment of the present invention to attain the above object, a processor instruction buffer controller comprises an instruction buffer which prefetches and writes instructions stored in the main storage, a writing pointer which keeps the writing address of the instruction fetched out of the main storage for writing to the instruction buffer, a reading pointer which keeps the reading address of the instruction serially fetched from the instruction buffer, a storage pointer which keeps the initial addresses of the predetermined number of instructions fetched from the instruction buffer and completed, a storage controller which controls so that the predetermined number of completed instructions are kept at the instruction buffer, a judgment means which judges whether the address of the instruction to be re-fetched exists between the writing pointer address and the storage pointer address and a reading controller which sets the re-fetch address at the reading pointer when the address of the re-fetched instruction exists there.

According to still another preferred embodiment, the judgment means outputs a buffer hit signal to the reading controller when it judges that the address for the re-fetched instruction exists between the writing pointer address and the storage pointer address and the reading controller sets the re-fetched address at the reading pointer upon receipt of the buffer hit signal. The storage controller updates the address at the storage pointer for the word length of the completed instruction firstly kept when the number of instructions fetched from the instruction buffer, completed and kept at the instruction buffer exceeds the predetermined number. A processor instruction buffer controller further comprises an instruction number holding means to count and hold the number of completed instructions, which outputs the word length of the completed instruction firstly counted to the storage controller when the number of instructions held there exceeds the predetermined number. Further, the instruction number holding means holds the word lengths of the predetermined number of completed instructions and, when the number of instructions held there exceeds the predetermined number, outputs the word length of the firstly held completed instruction to the storage controller.

Other objects, characteristics and effects of the present invention will be clarified in the detailed description below.

DESCRIPTION OF THE PREFERRED EMBODIMENT

Referring to the attached figures, preferred embodiments of the present invention will be described in detail below.

Figure 1:
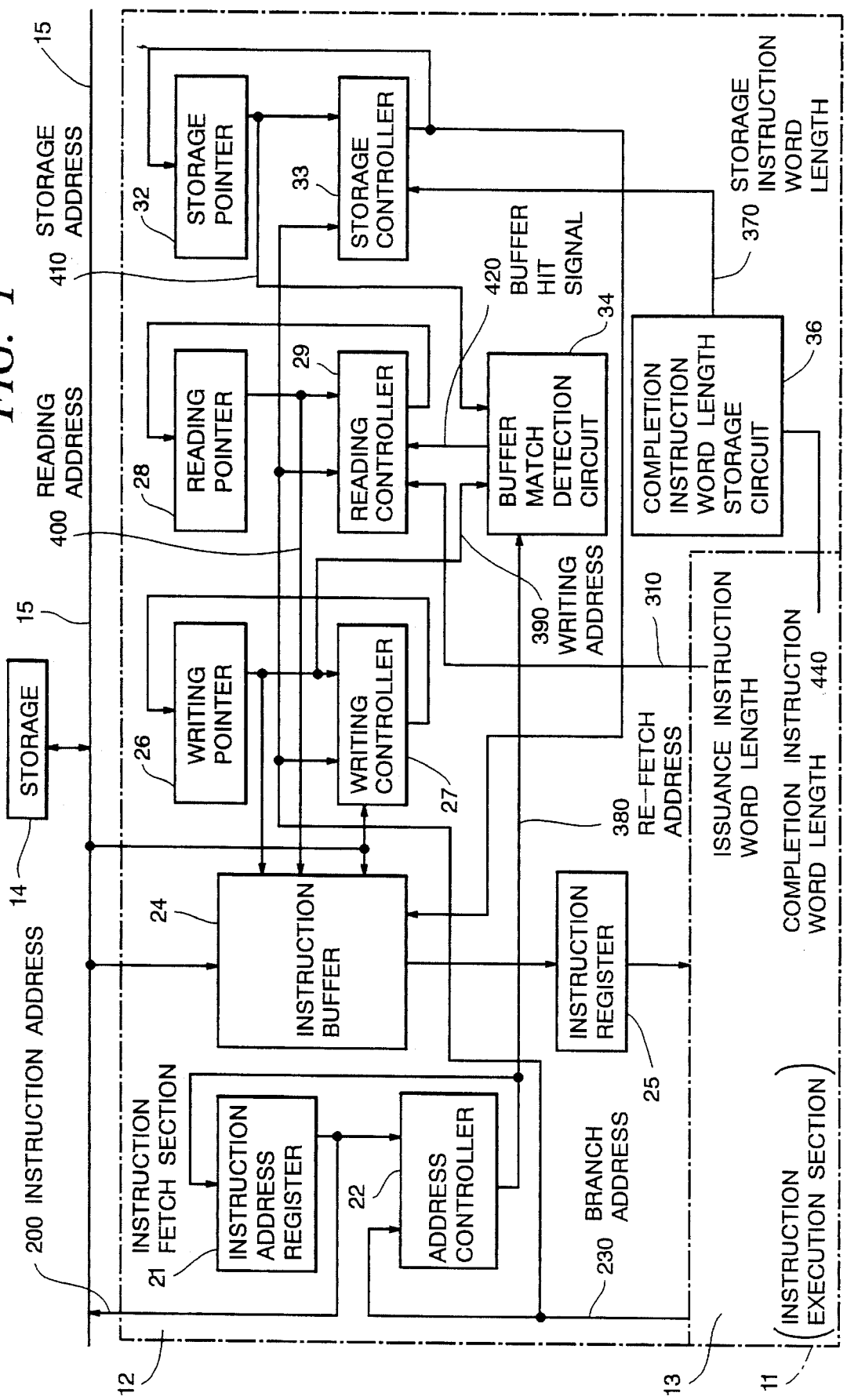
FIG. 1 is a block diagram to show an example of a processor where an instruction buffer controller of the present invention is applied.

FIG. 1 shows an embodiment of a processor where an instruction buffer controller of the present invention is applied. A processor 11 provided with an instruction buffer controller according to the present invention comprises an instruction fetch section 12 to fetch instructions and an instruction execution section 13 to execute the fetched instructions. The processor 11 is connected to a main storage 14 to store instructions via a system bus 15.

The instruction fetch section 12 comprises an instruction address register 21, an address controller 22, an instruction buffer 24, an instruction register 25, a writing pointer 26, (also referred to as a "storing" pointer) a writing controller 27, a reading pointer 28, a reading controller 29, a storage pointer 32, a storage controller 33, a buffer match detection circuit 34 and a completion instruction word length storage circuit 36.

The instruction address register 21 of the instruction fetch section 12 keeps an instruction address 200 of the instruction transferred from the main storage 14 and sends such instruction address 200 to the main storage 14 via the system bus 15. The instruction address 200 causes the applicable instruction to be sent from the main storage 14 and written to the instruction buffer 24 via the system bus 15. At the same time, the instruction address 200 output from the instruction address register 21 is supplied to the address controller 22.

The address controller 22 adds the access length (or instruction word length when the access is made for an entire instruction) to the instruction address previously accessed so as to update the instruction address kept at the instruction address register 21. The instruction address 200 at the instruction address register 21 is also updated by a branch address 230 sent from the instruction execution section 13 upon switching at the address controller 22.

The instruction buffer 24 to store instructions prefetched and transferred from the main storage 14 is connected with the main storage 14 via the system bus 15 and temporarily stores the instructions transferred from the main storage 14. The instruction fetched from the instruction buffer 24 is once stored in the instruction register 25 and then issued to the instruction execution section 13. The writing pointer 26 sets a writing address 390 for the instruction buffer 24 when the instruction transferred from the main storage 14 is written to the instruction buffer 24. The writing controller 27 updates the writing address 390 to be stored to at the writing pointer 26. Such updating of the writing pointer 26 is made when an instruction comes from the main storage 14 via the system bus 15 and written to the instruction buffer 24. The writing pointer 26 is also updated when a branch address 230 is sent during a branch instruction execution with replacement of the address with that branch address 230.

The reading pointer 28 connected with the instruction buffer 24 keeps a reading address 400 for fetching of the applicable instruction stored in the instruction buffer 24. The instruction fetched from the instruction buffer 24 according to this reading address 400 kept at the reading pointer 28 is issued to the instruction execution section 13 via the instruction register 25. The reading controller 29 updates the reading address 400 kept at the reading pointer 28. The reading address 400 at the reading pointer 28 is updated for an issuance instruction word length 310 sent from the instruction execution section 13. It indicates the word length of the instruction previously issued. Specifically, when the issuance instruction word length 310 is "1", the reading address is increased by 1 and when it is "2", the reading address is increased by 2. Further, the reading address is also updated when a branch address 230 is sent during branch instruction execution with replacement of the address with that branch address 230.

The storage pointer 32 of the instruction fetch section 12 maintains initial addresses (storage addresses 410) of the instructions which can be currently fetched from the instruction buffer 24. Specifically, when the buffer controller of the present invention is designed to keep the instruction currently being executed at the instruction buffer 24 until completion of execution, the storage pointer 32 keeps the address of the instruction fetched from the instruction buffer 24 and being currently executed. When the instruction buffer controller is designed to keep the executed instructions of a certain number (1 or more) at the instruction buffer 24, the storage pointer 32 keeps the initial addresses for certain number of instructions which have been fetched from the instruction buffer 24 and completed execution.

Every time a storage instruction word length 370 is input from the completion instruction word length storage circuit 36, the storage controller 33 updates the storage address 410 at the storage pointer 32 for the storage instruction word length 370. The storage address 410 at the storage pointer 32 is also updated when a branch address 230 is sent during execution of a branch instruction.

Further, when the storage controller 33 is arranged to keep the instruction currently being executed at the instruction buffer 24 until completion of the instruction execution, it controls so that the instruction currently being executed indicated by the storage address 410 at the storage pointer 32 is not driven out of the instruction buffer 24.

When the storage controller 33 is arranged to keep a certain number (1 or more) of completed instructions at the instruction buffer 24, it controls so that the certain number of completed instructions from the instruction indicated by the storage addresses 410 at the storage pointer 32 are not driven out of the instruction buffer 24.

The buffer match detection circuit 34 receives a re-fetch address 380 (=branch address) sent from the address controller 22 based on the branch address 230 in re-fetching of the instruction. The buffer match detection circuit 34 judges whether the re-fetch address 380 exists between the writing address 390 at the writing pointer 26 and the address 410 at the storage pointer 32. If it does, the buffer match detection circuit 34 outputs a buffer hit signal 420 to the reading controller 29.

The completion instruction word length storage circuit 36 stores the word length 440 of the instruction which has been completed at the instruction execution section 13 for a predetermined number of instructions. For example, when the instruction buffer 24 is arranged to keep two instructions after completion, if the firstly completed instruction has a word length of 2 bytes and the secondly completed instruction has a word length of 4 bytes, then the word lengths "2" and "4" for the two instructions are stored. If, after storage of these word lengths for the two instructions, a third completion instruction word length 440 (1 byte, for example) is input, then the firstly stored completion instruction word length (2 bytes) is sent to the storage controller 33 as the storage instruction word length 370. Then, the completion instruction word length storage circuit 36 now has "4", which is the word length of the second instruction and "1", which is the word length of the third instruction. Naturally, if the instruction buffer 24 is arranged to keep four instructions completed, the completion instruction word length storage circuit 36 keeps word lengths for four instructions.

In case the processor 11 is designed to have an instruction completed in one cycle, the issuance instruction word length 310 and the completion instruction word length 440 output from the instruction execution section 13 have the same value. However, if the processor 11 requires several cycles for instruction execution from issuance to completion, there are some instructions in the course of execution between the completed instruction and issued instruction, and the issuance instruction word length 310 may have a value different from that of the completion instruction word length 440. Obviously, if all the instructions have the same length, the issuance instruction word length 310 and the completion instruction word length 440 are the same regardless of the number of cycles at the processor 11.

Figure 2:
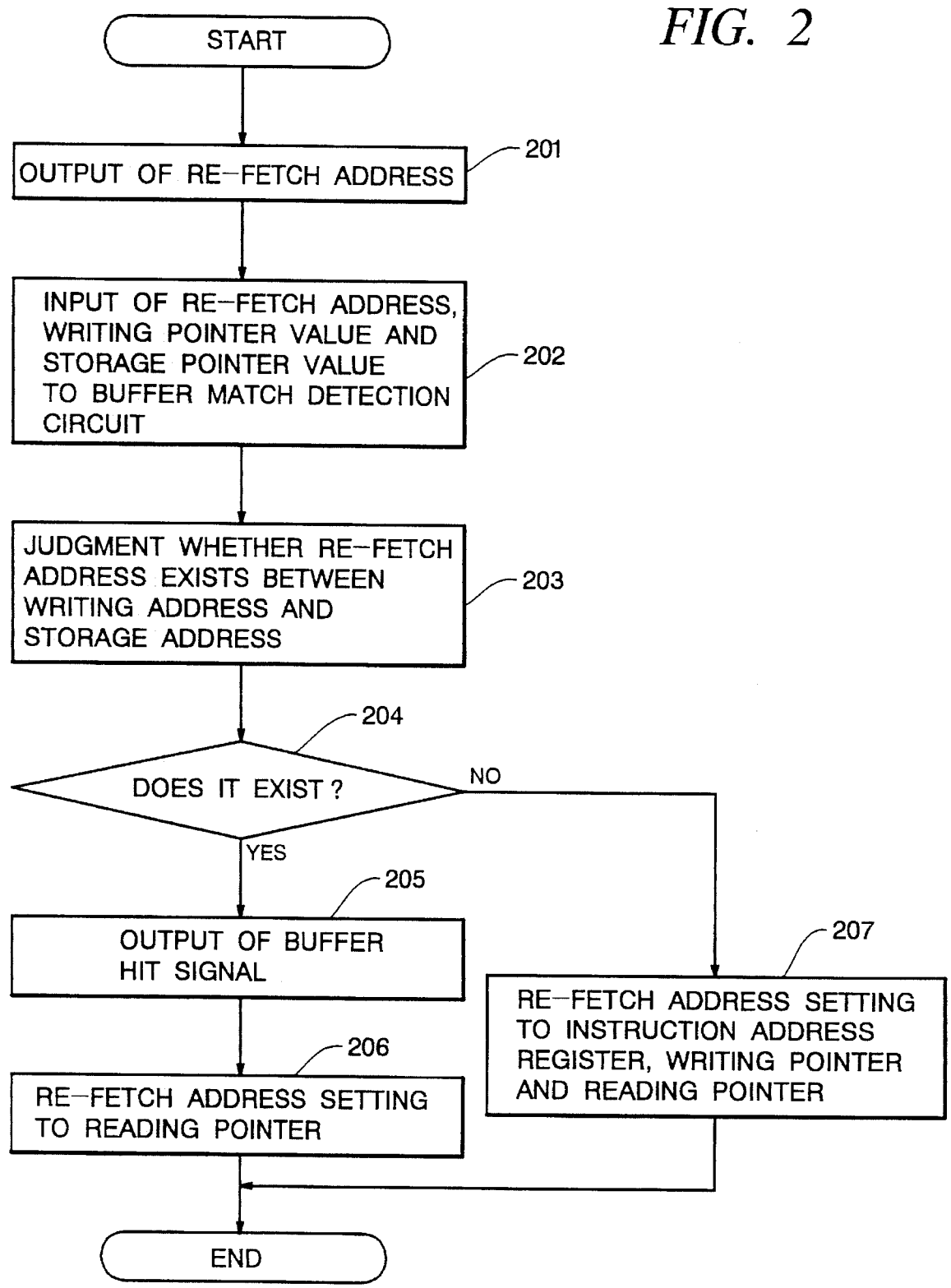
FIG. 2 is a flowchart to illustrate the processing where an instruction buffer controller re-fetches an instruction.

Next, referring to the flowchart of FIG. 2, the processing for instruction re-fetching in a buffer controller with the configuration as described above is now described.

Based on the branch address 230 output from the instruction execution section 13, the address controller 22 outputs a re-fetch address 380 (Step 201). The re-fetch address 380 is, together with the writing address 390 at the writing pointer 26 and the storage address 410 at the storage pointer 32, sent to the buffer match detection circuit 34 (Step 202) for judgment whether the re-fetch address 380 exists between the writing address 390 and the storage address 410 (Steps 203 and 204).

If, in Step 204, the re-fetch address 380 exists between the writing address 390 and the storage address 410, then the buffer match detection circuit 34 outputs a buffer hit signal 420 to the reading controller 29 (Step 205). The reading controller 29, upon receipt of the buffer hit signal 420, sets the re-fetch address 380 at the reading pointer 28 (Step 206). This causes the applicable instruction to be fetched from the instruction buffer 24 according to the re-fetch address 380.

If, in Step 204, the re-fetch address 380 does not exist between the writing address 390 and the storage address 410, then the address controller 22 sets the re-fetch address 380 at the instruction address register 21, the writing pointer 26 and the reading pointer 28 (Step 207). This causes the applicable instruction to be transferred from the main storage 14 to the instruction buffer 24 according to the re-fetch address 380.

The operation of the instruction buffer controller according to this embodiment will be specifically described below. In the following description, it is supposed that execution of an instruction at the instruction execution section 13 of the processor 11 is completed in one cycle.

Figure 3A:
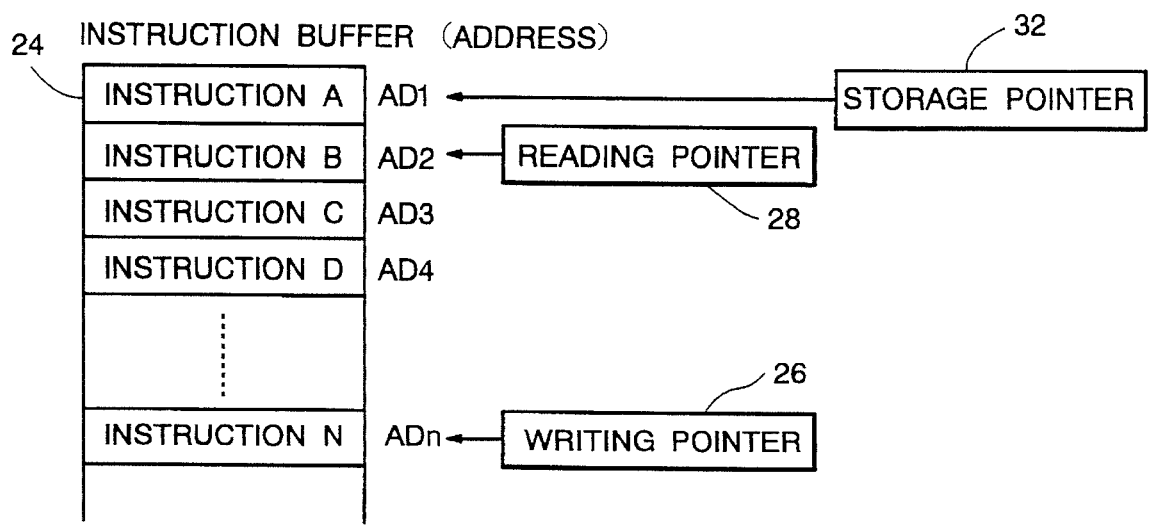
FIGS. 3A and FIG. 3B are each is an explanatory views to illustrate the operation where the instruction fetched from the instruction buffer is kept at the instruction buffer until execution of that instruction is completed.
Figure 3B:
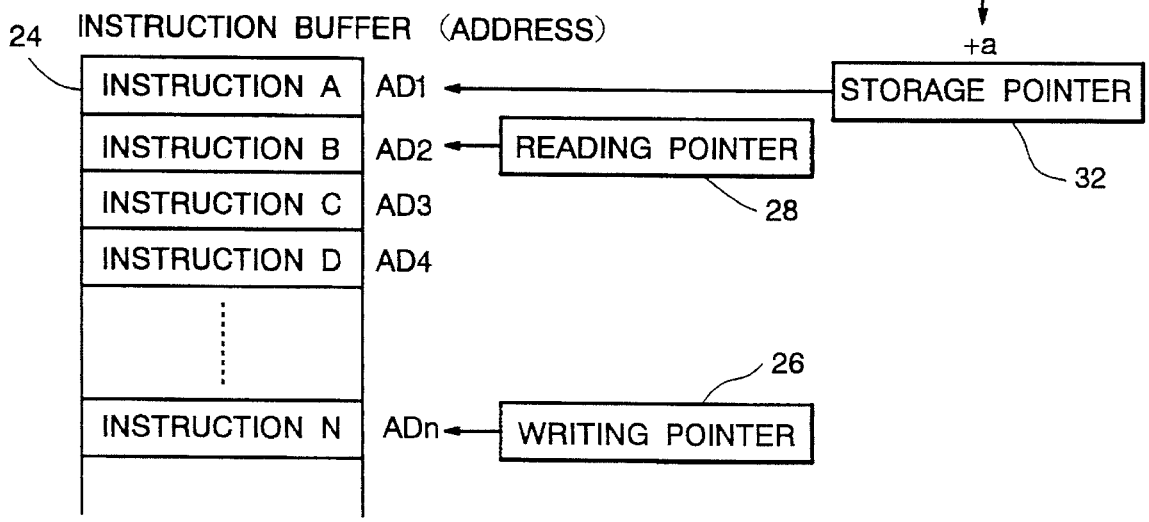

FIGS. 3A and 3B show the operation where the instruction buffer controller of the present invention is arranged to keep the instruction fetched from the instruction buffer 24 at the instruction buffer until execution of such instruction is completed. Suppose, for example, an interruption occurs during execution of an instruction and that instruction is to be executed with re-fetching after interruption processing.

Referring to FIG. 3A, if an interruption occurs during execution of the instruction A (with a word length of "a") and the instruction A is executed again with re-fetching after interruption processing is completed, the storage pointer 32 keeps the address AD1 of the instruction A, which is being executed, as the storage address 410. The storage controller 33 controls so that the instruction A specified by the storage pointer 32 is not driven out of the instruction buffer 24. At the reading pointer 28, the issuance instruction word length 310 from the instruction execution section 13 (="a", which is the word length of the instruction A) is added to AD1 and the address AD2 of the next instruction B is set. The writing pointer 26 has the address Adn set as the writing address 390.

When the branch address 230 (="AD1") for the instruction A to be executed again is output from the instruction execution section 13, the address controller 22 sends the re-fetch address 380 (=branch address 230) to the buffer match detection circuit 34. In this case, the re-fetch address 380 (="AD1") exists between the storage address 410 at the storage pointer 32(="AD1") and the writing address 390 at the writing pointer 26(="Adn"), and the buffer match detection circuit 34 outputs the buffer hit signal 420 to the reading controller 29. As a result, at the reading pointer 28, the re-fetch address 380 (="AD1") of the instruction A is set as the reading address 400.

According to the reading address 400 at this reading pointer 28, the instruction A is fetched from the instruction buffer 24. The fetched instruction A is stored at the instruction register 25 and issued to the instruction execution section 13. In other words, the instruction can be re-fetched from the instruction buffer 24 without transfer of the instruction from the main storage 14 via the system bus 15.

FIG. 3B shows the status where the instruction A has been completed and the instruction B is being executed. Since the instruction B (with a word length of "b") is fetched and issued to the instruction execution section 13 after execution of the instruction A, the issuance instruction word length 310 (="b", which is the word length of the instruction B) sent from the instruction execution section 13 is added to the address AD2 of the instruction B and the address AD3 of the instruction C is set as the reading address 400 at the reading pointer 28. At the same time, after completion of the instruction A, the word length "a" of the instruction A from the completion instruction word length storage circuit 36 is output to the storage controller 33 as the storage instruction word length 370 and added to the storage address 410 (AD1) at the storage pointer 32 for updating. In other words, the storage pointer 32 keeps the address of the instruction B currently being executed (AD2=AD1+a) as the storage address 410.

Figure 4A:
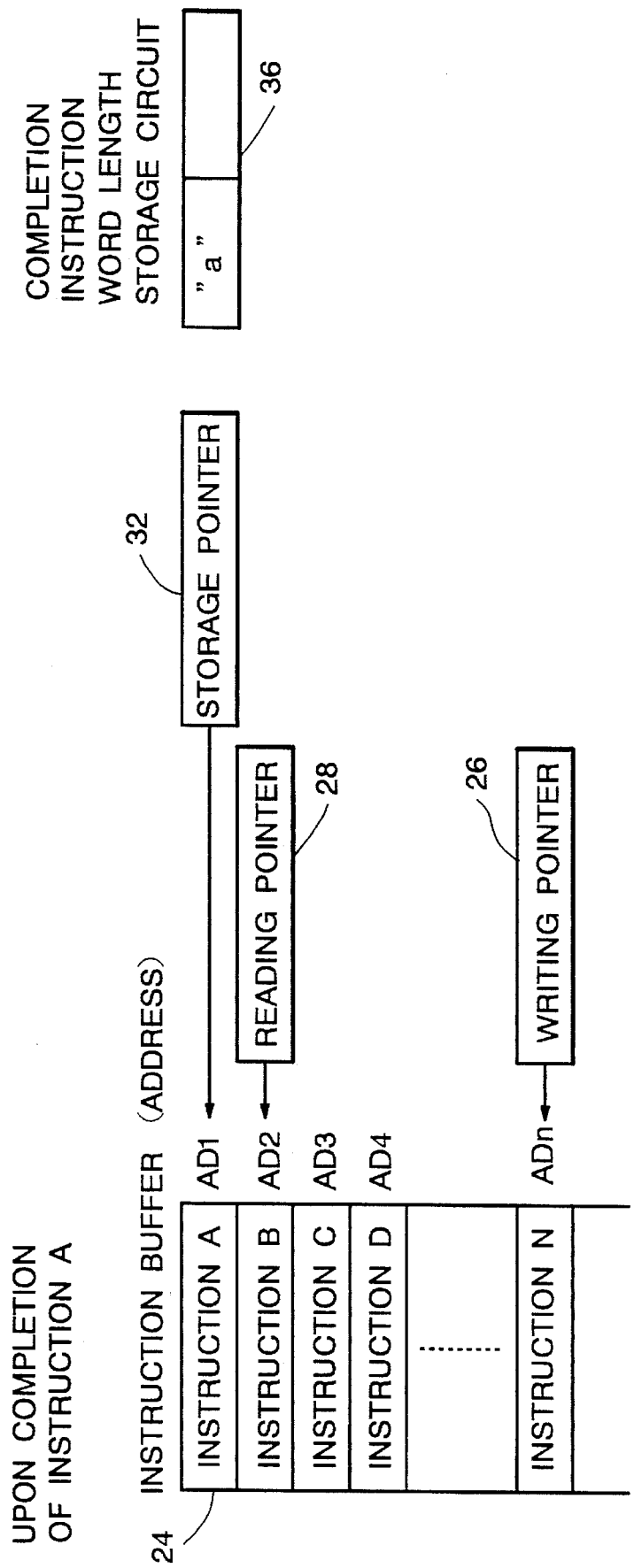
FIGS. 4A, 4B, and 4B, 4C are each explanatory views to illustrate the operation where two of the instructions already executed are kept.
Figure 4B:
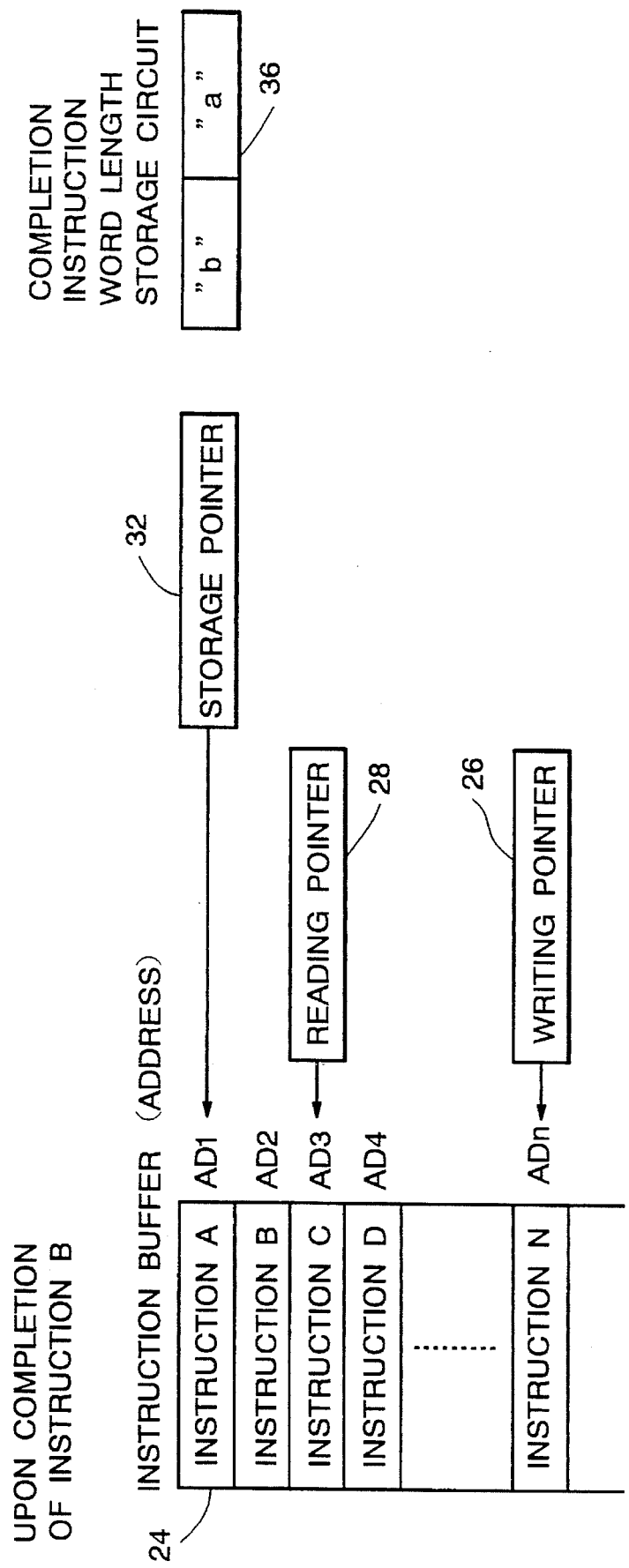
Figure 4C:
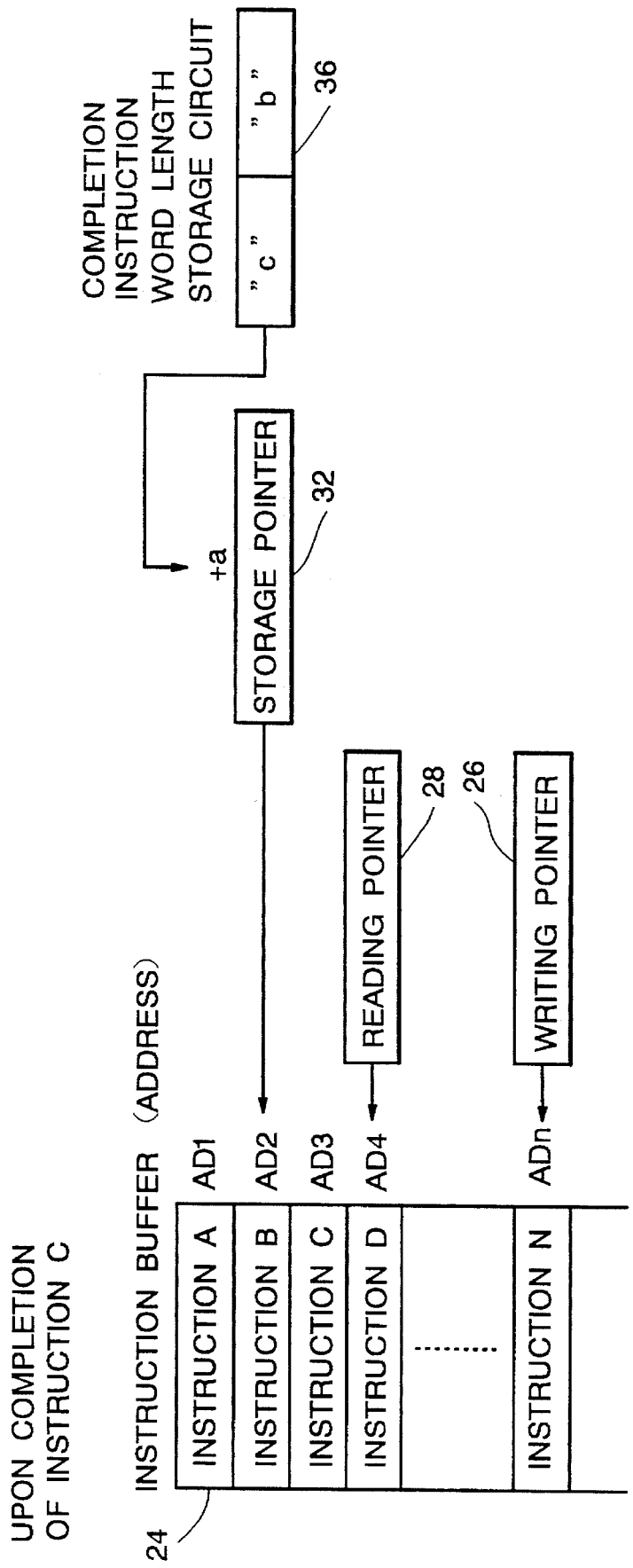

FIGS. 4A–4C show the operation of the controller when it is arranged to keep two instructions after completion. Suppose, for example, a branch instruction causes branching to a completed instruction kept with requiring re-fetching of that instruction completed.

Referring to FIG. 4A, for example, when the instruction A (with a word length of "a") is completed, the storage pointer 32 has the address of the completed instruction A (=AD1) as the storage address 410. Here, the completion instruction word length 440 (="a") of the instruction A from the instruction execution section 13 is sent to the completion instruction word length storage circuit 36, which stores the word length "a" of the instruction A.

Then, referring to FIG. 4B, when execution of the instruction B (with a word length of "b") is completed, the completion instruction word length 440 (="b") of the instruction B is sent from the instruction execution section 13 and provided to the completion instruction word length storage circuit 36, which stores the word lengths "a" and "b" for the two instructions. Since the predetermined number for the completion instructions to be stored in the instruction buffer 24 (=2) is not exceeded, the completion instruction word length storage circuit 36 does not output a storage instruction word length 370 to the storage controller 33. Accordingly, the storage pointer 32 is not updated and kept to have the address of the completed instruction A (=AD1) as the storage address 410.

Referring now to FIG. 4C, when execution of the instruction C (with a word length of "c") is completed, the instruction execution section 13 sends the completion instruction word length 440 (="c") of the instruction C to the completion instruction word length storage circuit 36, which stores the word length "c" of the instruction C. Here, the completion instruction word length storage circuit 36 already has the word lengths for two instructions (Instructions A and B). When the word length of the instruction C is stored, the predetermined number for the completion instructions to be stored in the instruction buffer 24 is exceeded. Therefore, the word length "a" of the instruction A firstly stored is driven out and the storage instruction word length 370 (="a") is output to the storage controller 33. The storage controller 33 updates the storage pointer 32 for the storage instruction word length 370 (="a"). In other words, "a" is added to AD1. As a result, the storage pointer 32 now has the address of the completed instruction B (=AD2) as the storage address 410.

Thereafter, every time an instruction execution is completed, the storage address 410 at the storage pointer 32 is updated in the same way. This causes the storage address 410 at the storage pointer 32 to always indicate the initial addresses of the two instructions previously completed. The storage controller 33 controls so that the two execution completion instructions (Instructions A and B in FIG. 4B and Instructions B and C in FIG. 4C) whose initial addresses are the same as the storage addresses 410 at the storage pointer 32 are not driven out of the instruction buffer 24.

Suppose now, for example, a branch instruction is given and branching is made to the completed instruction C existing in the instruction buffer 24 in the status as shown in FIG. 4C. When the branch address 230 (=AD3) of the branch instruction C is output from the instruction execution section 13, the address controller 22 supplies the re-fetch address 380 (=branch address 230) to the buffer match detection circuit 34. In this case, the re-fetch address 380 (=AD3) exists between the storage address 410 at the storage pointer 32 (=AD2) and the writing address 390 at the writing pointer 26 (=Adn), and the buffer match detection circuit 34 outputs the buffer bit signal 420 to the reading controller 29. As a result, the reading pointer 28 has the re-fetch address 380 of the instruction C set as the reading address 400.

According to this reading address 400 at the reading pointer 28, the instruction C is fetched from the instruction buffer 24. The fetched instruction C is stored in the instruction register 25, and issued to the instruction execution section 13. In other words, the completed instruction can be re-fetched from the instruction buffer 24 without transfer of the instruction from the main storage 14 via the system bus 15.

Thus, instructions during execution or after execution can be fetched directly from the instruction buffer 24, which eliminates the waste of time caused by repeated transfer from the main storage, resulting in improved processor performance.

Obviously, various modifications can be made to the above embodiments. It is intended to cover in the appended claims all such modifications and variations as fall within the true spirit and scope of the present invention.

What is claimed is:

1. An instruction buffer controller in a processor comprising:

an instruction buffer for storing instructions fetched out of a main storage;

a storing pointer for holding the storing address of an instruction fetched out of said main storage and stored in said instruction buffer;

a reading pointer for holding the reading address in said instruction buffer of an instruction serially fetched from said instruction buffer;

a storage pointer for holding the address of an instruction during execution in the instruction buffer;

a storage controller means, responsive to said instructions fetched from the main storage, for controlling said instruction buffer so that said instruction during execution is held in said instruction buffer until completion of execution of said instruction;

a judgement means, responsive to an instruction to be re-fetched, for judging whether an address of the instruction to be re-fetched exists between said storing address of said storing pointer and said address of said storage pointer; and a reading controller means for setting the address of the instruction to be re-fetched at said reading pointer when said address of the instruction to be re-fetched is judged by said judgement means to exist between said storing address of said storing pointer and said address of said storage pointer.

2. The instruction buffer controller in a processor of claim 1 wherein said judgement means outputs a buffer hit signal to said reading controller means when it judges that the address for the re-fetched instruction exists between said storing address of said storing pointer and said address of said storage pointer, and said reading controller means sets said address of the instruction to be re-fetched at said reading pointer upon receipt of said buffer hit signal.

3. The instruction buffer controller in a processor of claim 1 wherein said storage controller means updates the address in said storage pointer by a length of the completed instruction upon completion of the instruction fetched from said instruction buffer.

4. An instruction buffer controller in a processor comprising:

an instruction buffer for storing instructions fetched out of a main storage;

a storing pointer for holding the storing address of the instruction fetched out of said main storage and stored in said instruction buffer;

a reading pointer for holding the reading address in said instruction buffer of an instruction serially fetched from said instruction buffer, a storage pointer for holding the initial addresses of a predetermined number of instructions fetched from said instruction buffer and completed;

a storage controller means, responsive to said instructions fetched out of said main storage, for controlling said instruction buffer so that the predetermined number of completed instructions are held in said instruction buffer;

a judgement means, responsive to an instruction to be re-fetched, for judging whether the address of the instruction to be re-fetched exists between said storing address of said storing pointer and said address of said storage pointer; and a reading controller means for setting said address of the instruction to be re-fetched at said reading pointer when said address of the re-fetched instruction is judged by said judgement means to exist between said storing address of said storing pointer and said address of said storage pointer.

5. The instruction buffer controller in a processor of claim 4 wherein said judgement means outputs a buffer hit signal to said reading controller means when it judges that the address for the re-fetched instruction exists between said storing address of said storing pointer and said address of said storing pointer, and said reading controller means sets said address of the refetched instruction at said reading pointer upon receipt of said buffer hit signal.

6. The instruction buffer controller in a processor of claim 4 wherein said storage controller means updates the address in said storage pointer by a length of the completed instruction firstly held when the number of instructions fetched from said instruction buffer, completed and kept at the instruction buffer exceeds the predetermined number.

7. The instruction buffer controller in a processor of claim 4 further comprising an instruction number holding means to count and hold a number of completed instructions, which outputs a length of the completed instruction firstly counted to said storage controller means when the number of instructions held there exceeds said predetermined number.

8. The instruction buffer controller in a processor of claim 7 wherein said instruction number holding means holds the lengths of said predetermined number of completed instructions and, when the number of instructions held there exceeds said predetermined number, outputs a length of the firstly held completed instruction to said storage controller means.

\* \* \* \* \*